Sept. 2, 1941.  C. DORNIER  2,254,591
AIRCRAFT BRAKE
Filed Oct. 14, 1939  3 Sheets-Sheet 3
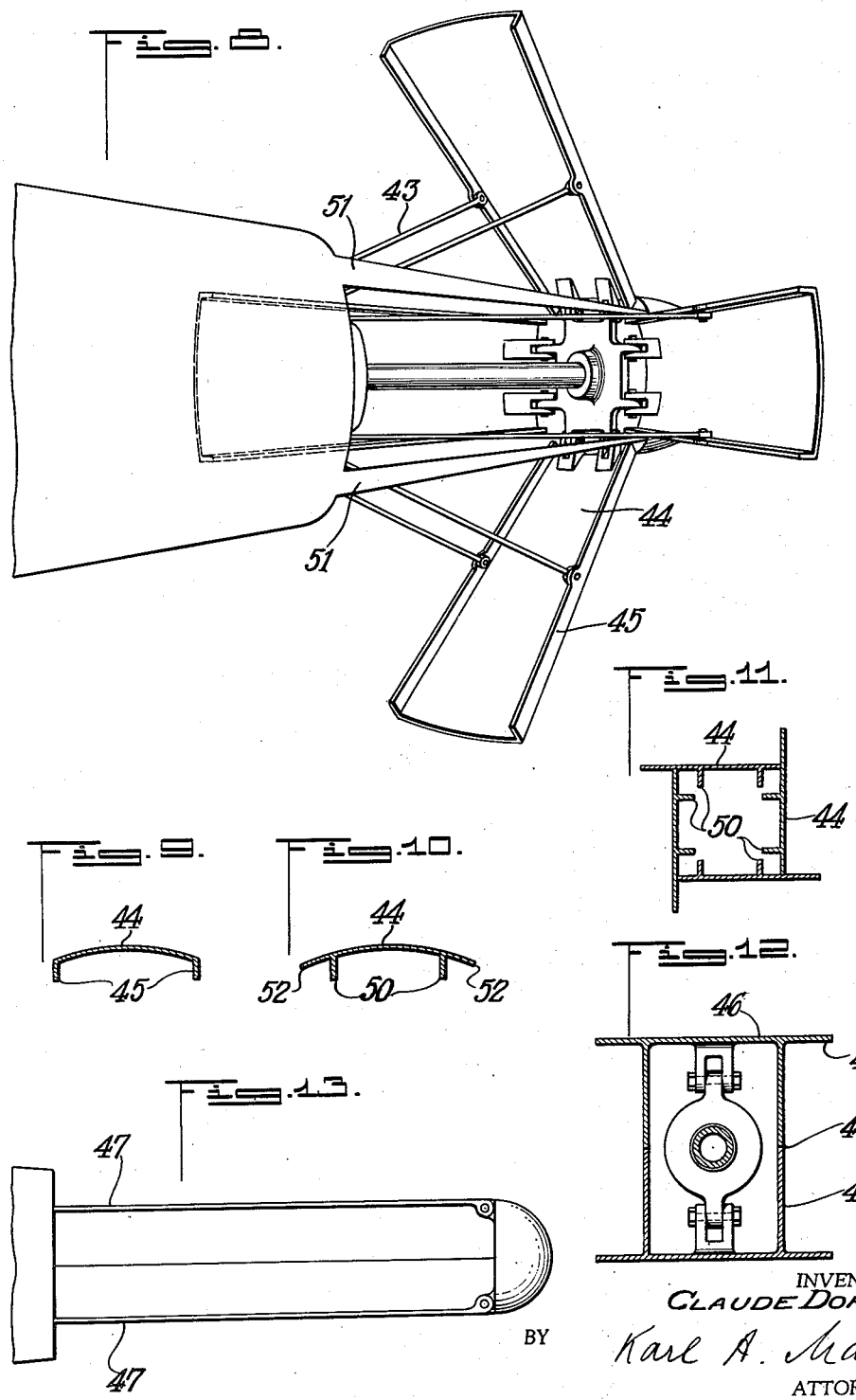
INVENTOR.
CLAUDE DORNIER.
BY Karl A. Mayr
ATTORNEY.

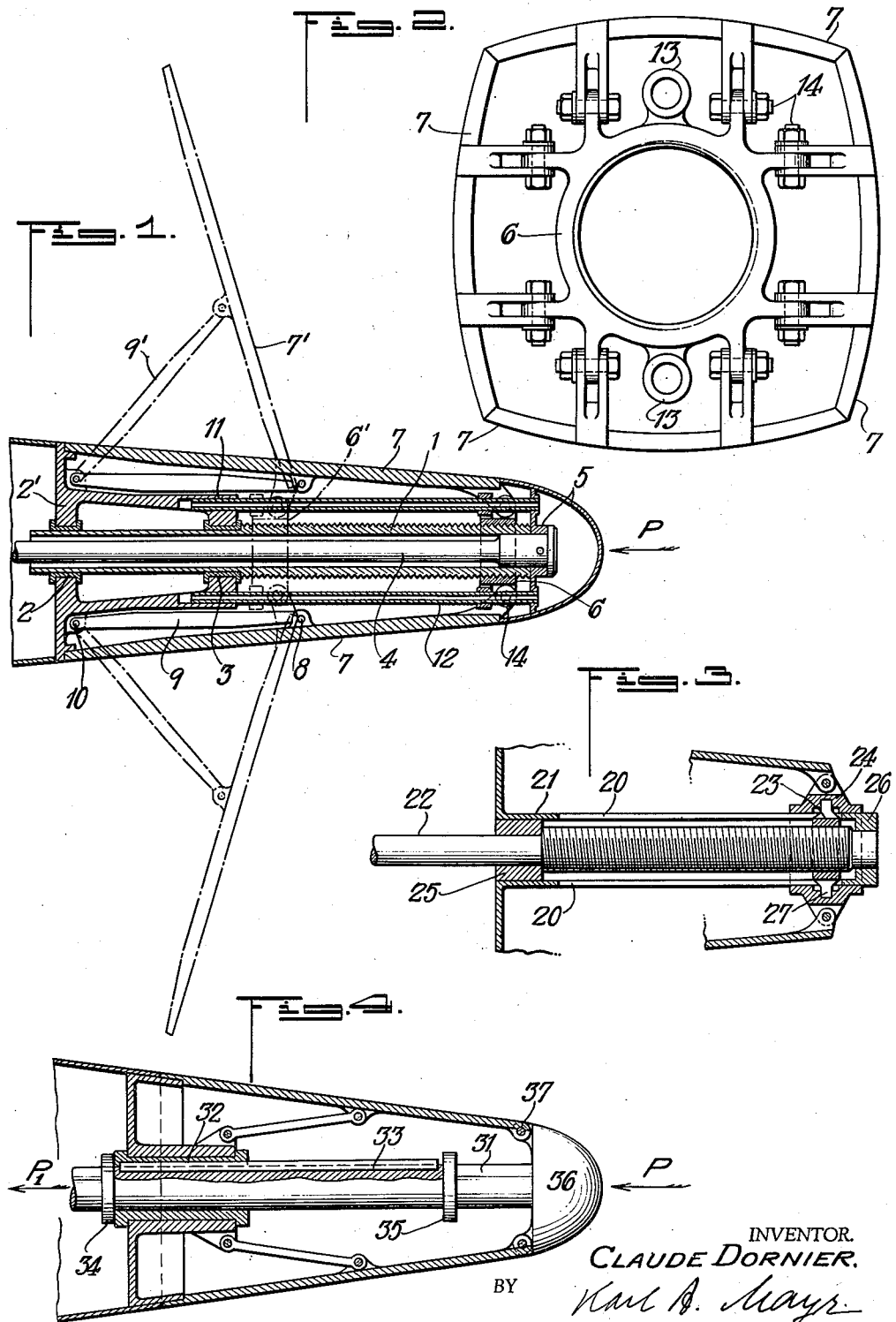

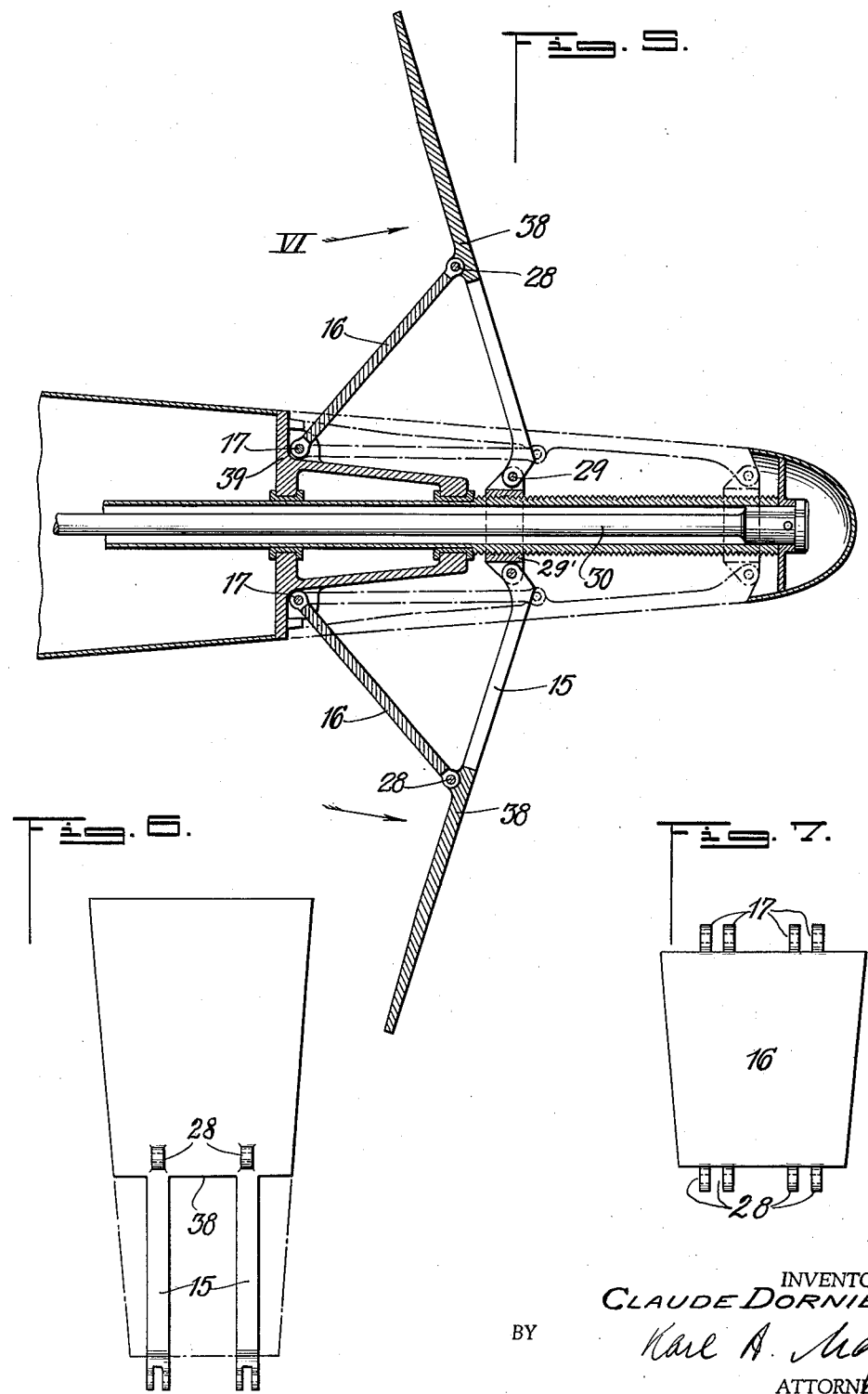

Patented Sept. 2, 1941

2,254,591

UNITED STATES PATENT OFFICE 2,254,591

AIRCRAFT BRAKE

Claude Dornier, Friedrichshafen-on-the-Bodensee, Germany, assignor of one-half to Dornier-Werke G. m. b. H., Friedrichshafen-on-the-Bodensee, Germany Application October 14, 1939, Serial No. 299,507
In Germany October 1, 1938

13 Claims. (Cl. 244—113)

The present invention relates to air brakes for aircraft more particularly to air brakes for aeroplanes which brakes are disposed at the rear end of the fuselage preferably in the rear of the tail unit.

Air brakes of the type set forth above have been proposed which comprise a support member for the brake flaps which member slides along a framework of substantially rhombic cross sectional configuration; said support member is tied by means of chains or the like to a nut member riding on a threaded spindle and is moved along by moving said nut member in opposite direction along said spindle.

It is an object of the present invention to provide a mechanism which comprises considerably less parts, which is less complicated and is operated by a reduced number of moving elements as compared with constructions mentioned in the paragraph next above.

The flap support element, according to the present invention, is slideable on a substantially cylindrical body which protrudes rearwards from the fuselage. Displacement of said support element may be effected by means of a threaded spindle which is disposed within said cylindrical body and a nut member cooperating with said spindle and being connected with said support element.

According to the invention the cylindrical body itself may be threaded and revolvable and may be used for operating the flaps directly, or said body may be displaceable in axial direction and may thus be adapted for direct operation of the flaps.

It is an object of the present invention to replace the framework used in previously proposed mechanisms by a cylindrical body and to cause the flap support element to move directly on or with said body and to thereby replace two constructional elements moving in opposite direction by one element. With the mechanism according to the present invention power transmission by means of chains, sprocket wheels, etc., is avoided.

The air brakes proposed hitherto are composed of a plurality of substantially sector shaped brake elements which are hinged at their narrow ends to a brake carrier and which were spread outward by means of suitable stay members. The brake effect of the inner or narrow end of such brake elements is naturally not very great. It is an object of the present invention to provide an air brake of increased braking surface. The brake elements according to the present invention have a braking leaf only at their outer part whereas the inner part is just a stem member which connects the leaf part with the brake support to which it is hinged and is only for the purpose of transmitting braking forces to the aircraft. According to the present invention the spreading members are made to form braking surfaces. These spreading members or brake leaves are disposed forward of the hinge points of the air brake and are therefore at a place where the cross section and surface of the fuselage is large and can therefore be of considerable size and be substantially as wide as the brake leaves of the brake elements proper.

The brake elements or brake leaves hitherto proposed consisted substantially of flat or curved thin members having a smooth surface which, when in closed position, were flush with the surface of the rear part of the fuselage.

The brake leaves or elements according to the present invention are provided with borders or ribs which project from the brake surface and prevent sliding off of the air to the side. The braking effect of the new brake leaves is thereby considerably increased and the brakes of same size have a greater braking effect or smaller and lighter brakes have the same braking effect as old brakes with larger and heavier leaves.

It is a further object of the present invention to provide brake leaves of increased size which, in closed position, project beyond the fuselage profile whereby the projecting parts of the leaf planes are situated in the direction of the air current so that they do not produce a braking effect.

Further and other objects and advantages of the present invention will be apparent from the accompanying specification and claims and shown in the drawings which, by way of illustration, show what I now consider to be preferred embodiments of my invention.

In the drawings:

Figure 1 is a longitudinal sectional view of a brake operating mechanism according to the present invention.

Figure 2 is a large scale view of an element of the mechanism shown in Figure 1 and in the direction of arrow P.

Figure 3 is a fractional sectional longitudinal view of a modified brake operating mechanism according to the present invention.

Figure 4 is a longitudinal part sectional view of another modification of a brake operating mechanism according to the present invention.

Figure 5 is a longitudinal sectional view of the rear end of a fuselage provided with an air brake according to the present invention.

Figure 6 is a top view of an individual brake flap according to the present invention and seen in the direction of arrow VI in Figure 5.

Figure 7 is a top view of an individual stay flap according to the present invention.

Figure 8 is an isometric illustration of an air brake according to the present invention showing the improved brake elements in particular.

Figure 9 is a cross sectional view of a brake element as used in the brake according to Figure 8.

Figure 10 is a cross sectional view of a modified brake element according to the present invention.

Figure 11 is a cross sectional view of a brake using brake elements of the general type shown in Figure 10 in closed position.

Figure 12 is a cross sectional view of a brake using modified brake elements of the type shown in Figure 10 in closed position.

Figure 13 is a side view of a closed brake according to Figure 12.

Referring more particularly to Figure 1 of the drawings the cylindrical body or hollow spindle 1 is revolvably supported in the bearings 2 and 3 of the rear end of the aeroplane fuselage. A rod or column member 4 which is rigidly connected with the aeroplane body is disposed within spindle 1 and carries the fuselage end piece 5. The flap support element 6 is constructed as a nut which cooperates with the threads provided on spindle 1. The flaps 7 are hinged to element 6 by means of hinges 14. Spreading stays 9 are fulcrumed at 8 to the brake flaps 7 and are swingably connected at 10 with the fuselage. The support element 6 is guided by means of two tubular guides 12 which are rigidly connected with the fuselage end part 5 and which extend into suitable bores 11 of the fuselage member 2'. Guides 12 extend through the guide bearings or eyelets 13 which are provided on element 6. Upon revolving spindle 1 support element 6 is moved, for example, to the left as seen in Figure 1 to assume position 6'. At the same time the stays 9 are swung outward into position 9' whereby the flaps 7 are spread into position 7'.

The flap support element 6 is shown in larger scale in Figure 2.

In the embodiment of the present invention illustrated in Figure 3 of the drawings the flap support element 24 slides on the stationary cylindrical hollow body 21 which projects rearwards from the fuselage and which is provided with longitudinal slots 20. A threaded spindle 22 is disposed within the body 21 and is revolvable in bearings 25 and 26. A nut member 23 rides on the spindle 22 which nut member is provided with projections 27 which are guided in slots 20 and engage the flap carrier 24.

In the embodiment of the present invention illustrated in Figure 4 the cylindrical body 31 has a smooth surface. Operation of the brake flaps is effected by axial displacement of the cylindrical body. Body or column member 31 is axially movably supported in bearing 32 which is connected with the rear end of the fuselage. Rotation is prevented by means of key 33 sliding in a key way provided in the bearing 32. The axial movement is limited both ways by means of rings 34 and 35 which may be shrunk to the body 31. The free rear end of body 31 forms the flap carrier 36 having hinges 37 for swingably holding the brake flaps. The brake flaps are opened and spread into braking position upon movement of body 31 in the direction of arrow P₁.

Figure 5 illustrates the rear end of a fuselage which is equipped with an air brake according to the present invention. The main brake flap 38 is swingably connected at 29 with the flap or brake operating or support element 29' and column 30. The stay element 16 is hinged at 28 to the flap 38. Below or inward from hinge 28 the brake element consists of two rods 15 only which transmit the brake forces to the rear end of the fuselage. Above or outward from the stay member connecting point 28 the brake element forms a conventional brake leaf.

The stay or spreading member 16 is built to form an efficient brake surface and is connected by means of hinge 28 with the main brake flap 38 and of hinge 17 with the fuselage part 39.

Figure 6 shows an individual brake element 38 seen in the direction of arrow VI in Figure 5 and Figure 7 an individual stay flap 16.

Figure 8 shows the rear end of a fuselage equipped with an air brake having brake elements of improved design. The brake leaves or surfaces 44 are provided with borders 45 which project from the leaves whereby the U shaped cross sectional configuration shown in Figure 9 is produced. The stays or spreading members 43 are connected with said borders 45 so that the borders are used not only for increasing air resistance and strength of the leaves but also for transmitting brake forces to the fuselage.

Figure 10 shows an alternative arrangement having ribs 50 instead of borders 45. Whereas with the construction according to Figures 8 and 9 intermediary stationary surface members 51 must be provided the edges 52 of adjacent leaves according to Figure 10 may be made to directly abut against one another when the brake is in closed position.

Figure 11 is a cross sectional view of a brake using brake elements of the general type shown in Figure 10 whereby the edge of one flap abuts against the brake surface of an adjacent flap.

Figure 12 is a cross sectional view of a closed brake comprising only two brake elements of the type shown in Figure 10. The ribs 49 are so high that the ends of the ribs of one brake element abut against the ends of the ribs of the other element at 48 when the brake is closed and form the walls of the end part of the fuselage.

The outer ends 47 of the brake elements protrude beyond the fuselage body but cause practically no air resistance because they are in the direction of the air current when the brake is closed.

Figure 13 is a diagrammatic illustration of the rear end of a fuselage with a brake according to Figure 12 in closed position.

While I believe the above described embodiments of my invention to be preferred embodiments, I wish it to be understood that I do not desire to be limited to the exact details of design and construction shown and described, for obvious modifications will occur to a person skilled in the art.

What is claimed is:

1. An air brake in aircraft having a fuselage, comprising, in combination, a brake element, a hollow cylindrical body protruding rearwards from said fuselage and having a longitudinal slot, a brake support element slideably disposed on said body, said brake element being directly hinged to said support element, a threaded spindle disposed within said hollow body, a nut member riding on said threaded spindle and having a part protruding through said slot and movably connected with said support element and slideably displacing said support element upon relative rotational movement of said spindle and nut member, and a link means disposed inside of said brake element and having a front end pivoted to said fuselage and a rear end pivoted to said brake element, said support element moving in the direction of flight for opening said brake and placing it in braking position and moving against the direction of flight for closing said brake and placing it into rest position.

2. An air brake for aircraft having a fuselage, said brake comprising a brake operating element connected with said fuselage, a main brake leaf, a connecting means hinged to said operating element and rigidly connected with said main brake leaf, and a link member so constructed as to form another brake leaf and pivoted at one end to said main brake leaf and at the other end to said fuselage.

3. An air brake for aircraft, comprising a column member protruding from said aircraft, a brake carrier slidingly connected with and axially movably with respect to said column member, a plurality of individual brake leaves hinged to said carrier, individual link members disposed substantially inside of said leaves individually pivoted at their rear ends to said leaves and at their front ends to said aircraft, said leaves swinging substantially radially outward from said column member and being spread apart upon movement of said carrier towards said aircraft and swinging towards one another and towards said column member and forming a closure therearound upon movement of said carrier from said aircraft, said leaves being provided with ribs protruding from the inner surface thereof and preventing sliding off of the air to the side for increasing the braking effect.

4. An air brake for aircraft, said brake comprising a column member protruding from said aircraft, a brake carrier slidingly connected with and axially movably with respect to said column member, a plurality of individual brake leaves hinged to said carrier, individual link members disposed substantially under said leaves and individually pivoted at their rear ends to said leaves and at their front ends to said aircraft, said leaves swinging substantially radially outward from said column member and being spread apart upon movement of said carrier towards said aircraft and swinging towards one another and towards said column member and forming a closure therearound and covering said link members upon movement of said carrier from said aircraft, said leaves having bent over edges extending from the leaves in the direction of movement of the aircraft and preventing sliding off of the air to the side for increasing the braking effect.

5. An air brake for aircraft, said brake comprising a column member protruding from said aircraft, a brake carrier slidingly connected with and axially movably with respect to said column member, a plurality of individual brake leaves hinged to said carrier, individual link members individually pivoted at one end to said leaves and at the other end to said aircraft, said leaves swinging substantially radially outward from said column member and being spread apart upon movement of said carrier towards said aircraft and swinging towards one another and towards said column member and forming a closure therearound upon movement of said carrier from said aircraft, each of said leaves having two lateral edges, one of said edges abutting against another leaf and the other of said edges projecting fin-like beyond the edge of another adjacent leaf when said leaves are swung towards one another and said brake is in closed position.

6. An air brake for aircraft, said brake comprising a column member protruding from said aircraft, a brake carrier slidingly connected with and axially movably with respect to said column member, a plurality of individual brake leaves hinged to said carrier, individual link members individually pivoted at one end to said leaves and at the other end to said aircraft, said leaves swinging substantially radially outward from said column member and being spread apart upon movement of said carrier towards said aircraft and swinging towards one another and towards said column member upon movement of said carrier from said aircraft, said leaves being individually provided with ribs protruding from the surface thereof, the edges of the ribs of one leaf abutting against the edges of the ribs of another leaf and enclosing said column member and carrier when said leaves are swung towards one another.

7. An air brake for aircraft, said brake comprising a column member protruding from said aircraft, a brake carrier slidingly connected with and axially movably with respect to said column member, a plurality of individual brake leaves hinged to said carrier, individual link members individually pivoted at one end to said leaves and at the other end to said aircraft, said leaves swinging substantially radially outward from said column member and being spread apart upon movement of said carrier towards said aircraft and swinging towards one another and towards said column member upon movement of said carrier from said aircraft, said leaves being individually provided with a plurality of ribs protruding from the surface thereof, the edges of the ribs of one leaf abutting the edges of the ribs of another leaf and enclosing said column member, said link members, and said carrier when said leaves are swung towards one another, said leaves having portions projecting laterally beyond said ribs and projecting fin-like from said brake when said leaves are swung towards one another and said brake is in rest position.

8. An air brake for aircraft, said brake comprising a column member protruding from said aircraft, a brake carrier slidingly connected with and axially movably with respect to said column member, a plurality of individual brake leaves hinged to said carrier, individual link members individually pivoted at one end to said leaves and at the other end to said aircraft, said leaves swinging substantially radially outward from said column member and being spread apart upon movement of said carrier towards said aircraft and swinging towards one another and towards said column member and forming a closure body therearound and covering said link members upon movement of said carrier from said aircraft, said leaves having portions fin-like projecting from said closure body when said leaves are swung towards one another.

9. An air brake for aircraft, comprising, in combination, a plurality of brake elements, a brake support means, a brake operating means longitudinally movably and directly connected with said support means, said brake elements being individually directly swingably connected with said operating means, and link means disposed substantially inside of said brake elements and pivoted individually at their front ends to said support means and at their rear ends to said brake elements, said brake operating means moving in the direction of flight for opening said brake and placing it in braking position and moving oppositely to the direction of flight for closing said brake and placing it into rest position.

10. An air brake for aircraft having a fuselage, said brake comprising, in combination, a plurality of brake elements, a substantially cylindrical brake support means disposed in the rear of said fuselage, a brake operating means longitudinally movably and directly connected with said support means, said brake elements being individually directly swingably connected with said operating means, and link means disposed substantially inside of said brake elements and pivoted individually at their front ends to said fuselage and at their rear ends to said brake elements, said brake operating means moving in the direction of flight for opening said brake and placing it in braking position and moving oppositely to the direction of flight for closing said brake and placing it into rest position.

11. An air brake in aircraft having a fuselage, said air brake comprising, in combination, a brake element, a cylindrical, threaded body protruding rearwards from said fuselage, brake support means comprising an internally threaded portion movably displaced around said threaded body and moving along said body upon rotation of said body, said brake element being directly hinged to said support means, and a support element disposed alongside said body and slideably movably connected with and supporting said brake support means thereof, a link member disposed inside of said brake element and pivoted at its rear end thereto and at its front end to said fuselage, said support means moving in the direction of flight for opening said brake and placing it in braking position and moving oppositely to the direction of flight for closing said brake and placing it into rest position.

12. An air brake in aircraft having a fuselage, said brake comprising a stationary support member protruding rearwards from said fuselage, air brake support means longitudinally movably connected with and supported by said support member, a brake element directly hinged to said support means, rotation preventing means associated with said stationary member and with said support means and preventing rotation of the latter, and a link member pivoted at its rear end to said brake element and at its front end to said fuselage and disposed inside of said brake element, said support means moving in the direction of flight for opening said brake and placing it in braking position and moving oppositely to the direction of flight for closing said brake and placing it into rest position.

13. An air brake for aircraft having a fuselage, said brake comprising a brake operating element operatively connected with the rear end of said fuselage, a main brake member hinged to said operating element, and a link member disposed inside of said brake member and hinged at its front end to said fuselage and at its rear end to said brake member and so constructed as to form itself a brake surface, said operating element moving in the direction of flight for opening said brake and placing it in braking position and moving oppositely to the direction of flight for closing said brake and placing it into rest position.

CLAUDE DORNIER.